(12) United States Patent
Mori et al.

(10) Patent No.: US 6,184,957 B1
(45) Date of Patent: *Feb. 6, 2001

(54) LIQUID CRYSTAL DISPLAY HAVING OPTICAL COMPENSATORY SHEET WITH NEGATIVE UNIAXIAL PROPERTY AND AN OPTICAL AXIS PARALLEL TO THE PLANE OF THE SHEET

(75) Inventors: Hiroyuki Mori; Taku Nakamura, both of Kanagawa (JP)

(73) Assignee: Fuji Photo Film Co., Ltd., Minami-Ashigara (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/856,614

(22) Filed: May 15, 1997

(30) Foreign Application Priority Data

May 15, 1996 (JP) .................................................. 8-119897
May 13, 1997 (JP) .................................................. 9-137579

(51) Int. Cl.[7] ............................................................ G02F 1/335
(52) U.S. Cl. ........................... 349/118; 349/120; 349/121; 349/117
(58) Field of Search ................................... 349/117, 118, 349/120, 121, 123, 136

(56) References Cited

U.S. PATENT DOCUMENTS

| | | | |
|---|---|---|---|
| 4,367,924 | * 1/1983 | Clark et al. | 350/334 |
| 4,786,147 | * 11/1988 | Clerc et al. | 349/178 |
| 4,813,770 | * 3/1989 | Clerc et al. | 349/118 |
| 5,033,825 | * 7/1991 | Ishikawa et al. | 349/117 |
| 5,138,474 | * 8/1992 | Arakawa | 349/120 |
| 5,150,235 | * 9/1992 | Haim et al. | 349/117 |
| 5,291,323 | * 3/1994 | Ohnishi et al. | 359/73 |
| 5,344,916 | * 9/1994 | Harris et al. | 349/120 |
| 5,430,565 | * 7/1995 | Yamanouchi et al. | 359/73 |
| 5,583,679 | * 12/1996 | Ito et al. | 349/118 |
| 5,600,464 | * 2/1997 | Ohe et al. | 349/123 |
| 5,688,979 | * 11/1997 | Weber et al. | 349/96 |
| 5,777,709 | * 7/1998 | Xu | 349/120 |
| 5,841,498 | * 11/1998 | Baur et al. | 349/141 |
| 5,895,106 | * 4/1999 | VanderPloeg et al. | 349/120 |

OTHER PUBLICATIONS

"Liquid Crystals, Applications and Uses," edited by B. Bahadur, vol. 1, *World Scientific*, 1990, pp. 305–307, 13 Ferroelectric LCDs, 13.1 (Introduction).

N. Koshoubu et al., "S6–3 Driving Technique in Full Color Antiferroelectric Liquid Crystal Displays," Proceedings of the 15th International Display Research Conference, Asia Display '95 (1995), pp. 69–72.

M. Ohta et al., "S30–2 Development of Super–TFT–LCDs with In–Plane Switching Display Mode," Proceedings of the 15th International Display Research Conference, Asia Display '95 (1995), pp. 707–710.

* cited by examiner

*Primary Examiner*—James A. Dudek
(74) *Attorney, Agent, or Firm*—Burns, Doane, Swecker & Mathis, LLP

(57) ABSTRACT

A liquid crystal display is composed of a liquid crystal cell which comprises a pair of transparent substrates at least one of which is provided with an electrode thereon and liquid crystal sealed therebetween, a polarizing sheet arranged on at least one side of the cell, the liquid crystal aligning parallel to a plane of the substrate and varying its direction of molecular major axis in a plane parallel to the plane of the substrate under variation of voltage applied to the liquid crystal cell. The liquid crystal display has an optical compensatory sheet between at least one side of the liquid crystal cell and the polarizing sheet, the optical compensatory sheet having an optically negative uniaxial property and an optic axis parallel to a plane of the sheet.

6 Claims, 10 Drawing Sheets

Off-state

On-State

US 6,184,957 B1

LIQUID CRYSTAL DISPLAY HAVING OPTICAL COMPENSATORY SHEET WITH NEGATIVE UNIAXIAL PROPERTY AND AN OPTICAL AXIS PARALLEL TO THE PLANE OF THE SHEET

BACKGROUND OF THE INVENTION

1. Field of the Invention

The present invention relates to a liquid crystal display which is improved in viewing angle characteristics.

2. Description of Prior Art

As a display for electronic office system-devices such as a desk-top personal computer and a word processor, CRTs (cathode ray tube) have been employed so far. Recently, a liquid crystal displays (hereinafter referred to as LCD) are widely employed instead of the CRTs because of their small thickness, light weight and low power consumption. The LCD, however, does not have good display characteristics (especially enlarged viewing angle) equal to those of CRT. The LCD generally has a structure that a liquid crystal cell is disposed between a pair of polarizing sheets. Most of LCDs use a twisted nematic liquid crystal. The operational modes of LCD using the twisted nematic liquid crystal are roughly divided into a birefringence mode and an optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such a STN-LCD, therefore, has an advantage of giving the display of a large volume by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of the following liquid crystal display utilizing an optically rotary mode and further provided with the known active-type elements (e.g., TFT-LCD and MIM-LCD).

In the TFT-LCD and MIM-LCD, twisted nematic liquid crystal showing a twisted angle of 90 degrees and having positive birefringence is employed for displaying an image. This is called LCD of an optically rotary mode (i.e., TN-LCD). The TN-LCD display mode shows rapid response (such as several tens of milliseconds) and high display contrast, and easily gives black-white display of high contrast. Hence, the optical rotatory mode has a number of advantages compared with the birefringence mode or other modes. However, the TN-LCD has disadvantages such as color or contrast on display varies depending upon viewing angle to a liquid crystal display, and its display characteristics are not comparable to display characteristics of a CRT.

In order to improve the viewing angle characteristics (i.e. to enlarge the viewable angle), arrangement of a phase difference film (optical compensatory sheet) between a pair of polarizing plates and TN liquid crystal cell was proposed, and various optical compensatory sheets have been proposed up to now. Arrangement of the optical compensatory sheet enlarges the viewing angle to some extent however the enlargement is not sufficiently satisfactory.

Recently, a liquid crystal cell showing an inherently enlarged viewing angle has been proposed (e.g., Japanese Patent Provisional Publication No. 7(1995)-84254 and U.S. Pat. No. 5,410,422). The liquid crystal cell has a liquid crystal layer comprising liquid crystal capable of forming bend orientation therein and is a self-compensatory cell in which the molecular major axis of liquid crystal is symmetrical with respect to a center line between the substrates of the liquid crystal cell. The liquid crystal cell shows inherently an enlarged viewing angle.

Further, an abstract (29a-SZC-20, Collected abstracts of Applied Physical Society, 42nd, Spring, 1995) has proposed a reflective type liquid crystal display employing HAN mode (Hybrid-aligned-nematic mode) cell which utilizes the upper side of the liquid crystal layer of the bend orientation cell.

These self-compensatory cells bring about inherently an enlarged viewing angle, which is not equal to that given by a CRT. The application for LCD provided with an optical compensatory sheet suitable for the self-compensatory cell (U.S. application Ser. No. 749,894) has been already filed.

In the above-mentioned TN-LCD and the self-compensatory LCD, the display is conducted by selectively applying an electric field (voltage) in a direction perpendicular to the substrates of liquid crystal cell of LCD. To apply electric field or not gives variation of a direction of a molecular major axis of liquid crystal between the directions almost parallel and perpendicular to the substrates. Thus, display of black and white is mainly done by variation of direction of a molecular major axis in a plane perpendicular to the substrate. Therefore, retardation in the liquid crystal layer of LCD greatly varies depending upon variation of viewing angle, which results in variation of display color and contrast depending upon viewing angle.

A display mode utilizing a method applying electric field in a direction parallel to the substrates, which is not the above method applying electric field in a direction perpendicular to the substrates, has been proposed. The display mode is described in, for example, Asia Display '95 (The Institute of Telvision Engineers of Japan & The Society for information Display, pages 577–580 and 707–710), and Japanese Patent Provisional Publication No. 7(1995)-261152, and is referred to as "IPS mode" (In-plane Switching).

The IPS mode described in Asia Display '95 (pages 577–580) is explained according to the description referring to FIG. 1.

FIG. 1 (A) shows the arrangement of liquid crystal molecules and the condition of light in LCD utilizing IPS mode (IPS mode LCD) under no application of electric field (off state), and FIG. 1 (B) shows the arrangement of liquid crystal molecules and the condition of light in IPS mode LCD under application of electric field.

In FIG. 1 (A), nematic liquid crystal molecules 16 are aligned parallel to the substrates 13, 17 (i.e., homogeneous alignment), the substrate 13 having electrodes 14 thereon. An area of the substrate shown in FIG. 1 (A) usually corresponds to one pixel. The liquid crystal molecules respond to an electric field (voltage) with being kept in the plane parallel to the substrates. The optic axis directions (i.e., major axis directions) of the homogeneously aligned nematic liquid crystal molecules are almost parallel to polarization axis of a polarizing plate 12. The polarizing plates 12 and 19 (polariser and analyzer) are set such that the axes are in a crisscross. The arrangement of the polarizing plates gives a pure black state under no application of electric field to the LCD, because light 11 incident upon the LCD is not polarized within a layer of the liquid crystal molecules (liquid crystal layer).

In the case that an electric field is applied in the direction parallel to the substrates, the major axes of liquid crystal molecules are deviated from the axis of the polarizing plate 12, as shown in FIG. 1 (B). As a result, when the light 11 incident upon the LCD is passed through the liquid crystal layer, phase retardation occurs in the light due to the different propagating rates of the extraordinary and ordinary rays. Therefore, the light 11 is polarized (by the phase retardation) to pass through the polarizing plate 19. Thus, light transmission of the LCD is increased with increase of electric field to give a white state. The reference number 18 indicates polarized state of light passed through the liquid crystal layer. The 45 degree deviation of the optic axis of the liquid crystal molecule brings about maximum transmittance.

SUMMERY OF THE INVENTION

In IPS mode LCD mentioned above, the liquid crystal molecules are scarcely tilted to a plane perpendicular to the substrates of LCD, and therefore viewing angle characteristics are greatly improved. The inventors have found, however, that when the IPS mode LCD is viewed in the specific oblique direction, reversion of gradation and coloration are produced not to enlarge viewing angle in the specific direction. Thus, a CRT cannot be replaced in all respects by the IPS mode LCD, unless the above problems (reversion of gradation and coloration) are resolved.

It is a object of the invention to provide a liquid crystal display provided with an optical compensatory sheet which shows high contrast in an enlarged viewing angle and is almost free from reversion of gradation and coloration in an enlarged viewing angle.

It is another object of the invention to provide a liquid crystal display provided with an optical compensatory sheet which has an enlarged viewing angle and by which CRT can be replaced.

There is provided by the invention a liquid crystal display comprising a liquid crystal cell which comprises a pair of transparent substrates which are arranged paralell to each other and at least one of which is provided with an electrode thereon and liquid crystal sealed therebetween, a polarizing sheet arranged at least on one side of the cell, the liquid crystal aligning parallel to planes of the substrates and varying its direction of molecular major axis on a plane parallel to the planes of the substrates under variation of voltage applied to the liquid crystal cell;

wherein an optical compensatory sheet is provided between at least one side of the liquid crystal cell and the polarizing sheet, and the optical compensatory sheet has an optically negative uniaxial property and an optic axis parallel to an plane of the sheet.

Preferred embodiments of liquid crystal display according to the invention are as follows:

1) The liquid crystal display wherein the optical compensatory sheet satisfies the conditions of:

$$20 \leq (n_x - n_y) \times d \leq 1000 \quad (1)$$

$$0 \leq |(n_x - n_z) \times d| \leq 200 \quad (2)$$

in which $n_x$ and $n_y$ are main refractive indices within the sheet (wherein $n_x$ and $n_y$ are perpendicular to each other), $n_z$ is a main refractive index in the thickness direction of the sheet, and d is the thickness in terms of nm of the sheet.

2) The liquid crystal display wherein the optical compensatory sheet comprises a polymer having a negative intrinsic birefringence.

3) The liquid crystal display wherein the optical compensatory sheet is a film comprising a copolymer (especially graft copolymer) derived from styrene and at least one of monomers polymerizable with styrene.

4) The liquid crystal display wherein the liquid crystal cell is provided with a means of applying voltage in a direction parallel to the planes of the substrates.

5) The liquid crystal display above 4) wherein at least one of the substrates of the liquid crystal cell has an insulation layer (for the protection of the electrode) on the electrode of the substrate.

6) The liquid crystal display above 4) wherein the liquid crystal is nematic liquid crystal.

7) The liquid crystal display wherein the liquid crystal is ferroelectric liquid crystal or anti-ferroelectric liquid crystal.

8) The liquid crystal display wherein the polarizing sheet is arranged on each side of the cell.

9) The liquid crystal display which is driven in a normally black mode.

The liquid crystal display provided with the specific optical compensatory sheet according to the invention shows high contrast in an enlarged viewing angle and is almost free from reversion of gradation and coloration in an enlarged viewing angle. Therefore, CRT can be replaced by the liquid crystal display.

Particularly, the liquid crystal display of the invention advantageously shows the above excellent characteristics in the case of utilizing IPS mode.

DETAILED DESCRIPTION OF THE INVENTION

The liquid crystal display of the invention has a basic structure comprising a liquid crystal cell which comprises a pair of transparent substrates at least one of which is provided with an electrode thereon and liquid crystal sealed therebetween, a polarizing sheet arranged on at least one side of the cell, and an optical compensatory sheet provided between at least one side of the liquid crystal cell. Further, in the LCD, the liquid crystal aligns parallel to a plane of the substrate and varies its direction of molecular major axis on a plane parallel to the plane of the substrate under variation of voltage applied to the liquid crystal cell.

Figure 1A:
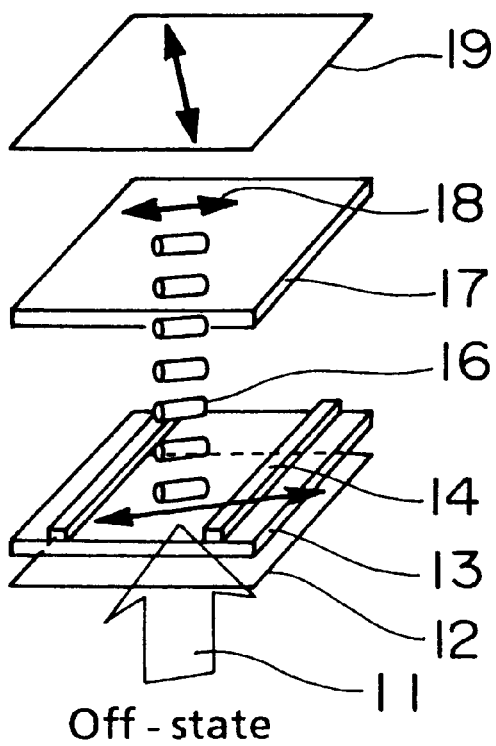
FIG. 1 is a schematic view for explanation of principle of IPS mode which is advantageously utilized for the invention.
Figure 1B:
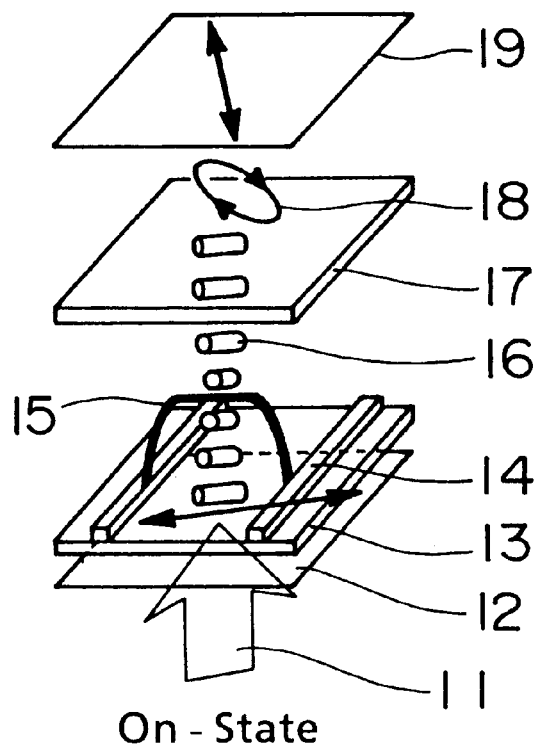
Figure 2A:
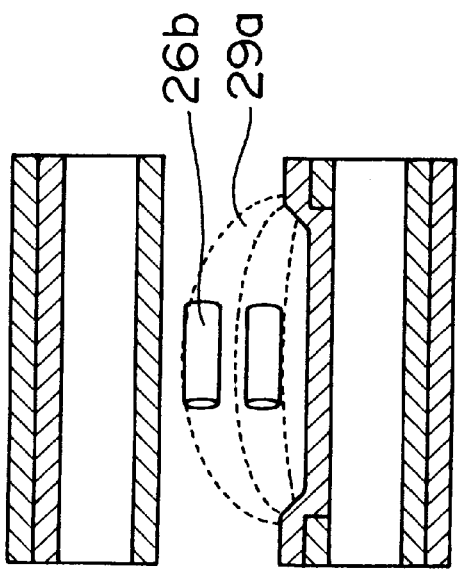
FIG. 2 is a view schematically showing an example of the liquid crystal display utilizing IPS mode according to the invention.
Figure 2C:
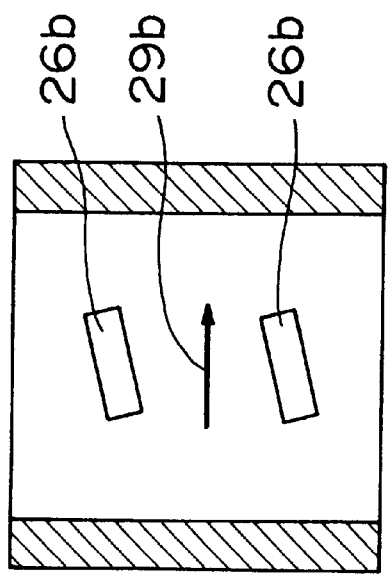
Figure 2B:
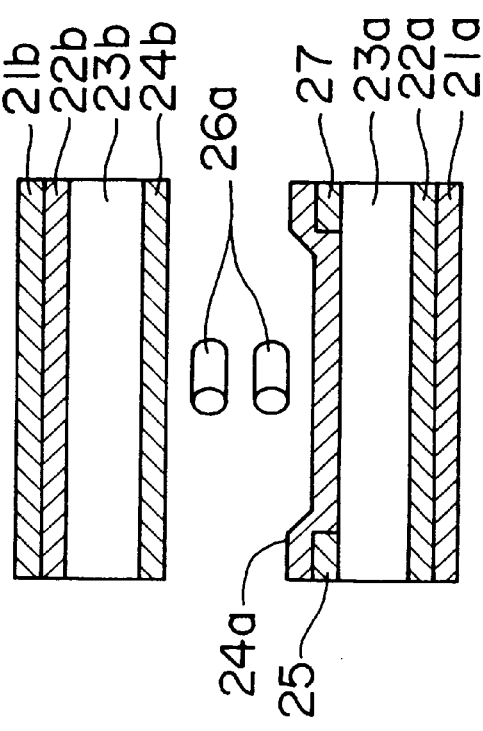
Figure 2D:
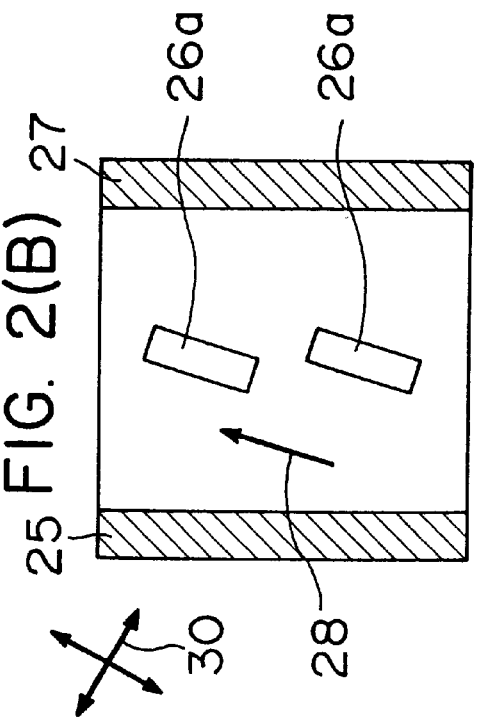

The liquid crystal display of the invention preferably utilizes the IPS mode shown in FIG. 1. In the liquid crystal display of the invention, an optical compensatory sheet is further provided to the LCD of FIG. 1. The structure of the liquid crystal display of the invention is explained referring to FIG. 2 below. As for the direction of molecular major axis of liquid crystal under application of voltage in FIG. 1 and FIG. 2, the direction of major axis in FIG. 1 is almost perpendicular to the direction of the electric field, whereas the direction of major axis in FIG. 2 is almost parallel to the direction of the electric field. This is because the liquid crystals in FIG. 1 and FIG. 2 are different from each other in dielectric anisotropy.

FIG. 2 (a) and (b) show the arrangement of liquid crystal molecules under no application of electric field (off state), and are a sectional view and a planar view, respectively. FIG. 2 (c) and (d) show the arrangement of liquid crystal molecules under application of electric field (on state), and are a sectional view and a planar view, respectively. An area of the substrate shown in FIG. 2 usually corresponds to one pixel. Further, no application or application of electric field may correspond with application of electric field of a small or large voltage, respectively.

In FIG. 2 (a), a pair of belt-shaped electrodes 25, 27 are provided on a transparent substrate 23a, and a protective insulation layer 24a is formed on both the linear electrodes and the transparent substrate. On the reverse side (surface) of the transparent substrate 23a, an optical compensatory sheet 22a and a polarizing sheet 21a are provided in order.

On a transparent substrate 23b faced to the transparent substrate 23a, a protective insulation layer 24b is formed and the reverse side of the transparent substrate 23b has an optical compensatory sheet 22b and a polarizing sheet 21b in order. Liquid crystal molecules 26a (generally having positive anisotropy of dielectric constant) are sealed between the transparent substrates 23a, 23b.

In FIG. 2 (b), which is a plane view of the LCD of FIG. 2 (a) (the upper composite including the substrate is removed), only the linear electrodes 25, 27 and the liquid crystal molecules 26a are shown. The arrow 28 indicates a rubbing direction of an orientation layer (not shown) provided on the linear electrode. The major axes of the liquid crystal molecules 26a are aligned parallel to the substrate (i.e., homogeneous alignment) along the rubbing direction (28). An orthogonal arrow 30 indicates directions of the polarization axes (transmission axes) of the polarizing sheets 21a, 21b. The direction of the polarization axis of the polarizing sheet 21a is parallel to that of the arrow 28 (the rubbing direction, the direction of the major axis), and the direction of the polarization axis of the polarizing sheet 21b is perpendicular to that of the arrow 28. Thus, light incident upon the polarizing sheet 21a is passed through a layer of the liquid crystal molecules with no occurrence of polarization, and therefore is completely interrupted by the polarizing sheet 21b to give a black display.

As shown in FIG. 2 (c), an electric field is formed between the linear electrodes 25, 27 when voltage is applied to the electrodes, and the liquid crystal molecules are aligned along the direction of the electric field. The reference number 26b indicates the aligned liquid crystal molecules. FIG. 2 (c) shows that the directions of the major axes of the liquid crystal molecules vary within the plane parallel to the substrate by application of voltage.

In FIG. 2 (d), which is a plane view of the LCD of FIG. 2 (c), only the liquid crystal molecules 26b and the direction of the electric field 29b are shown. Light incident upon the polarizing sheet 21a is passed through a layer of the liquid crystal molecules to be polarized, and therefore most of the light can be passed through the polarizing sheet 21b to give a white display.

As shown in FIG. 2, when the liquid crystal in the liquid crystal cell shows homogeneous alignment under no application of voltage, a pair of polarizing sheets are preferably arranged such that their polarization axes 30 are perpendicular to each other. When the liquid crystal in the liquid crystal cell forms twisted alignment at twisted angle of 90 degrees with be kept in the plane parallel to the substrate under no application of voltage, a pair of polarizing sheets are preferably arranged such that their polarization axes are parallel to each other.

In FIG. 2 (c), the liquid crystal molecules are aligned along the direction of the electric field. However, some liquid crystal molecules (e.g., liquid crystal having negative anisotropy of dielectric constant) show behavior different from that of the above-mentioned liquid crystal molecules (e.g., to align perpendicular to the electric field). Thus, the arrangement of electrodes, polarizing sheets, etc., are designed depending upon the kind of liquid crystal.

In the invention, the optical compensatory sheet is preferably disposed between the two polarizing sheets. Further, the optical compensatory sheet may be employed singly or in two or more sheets. The optical compensatory sheet is preferably employed singly or in two sheets. In the case of using two sheets, it is preferred to dispose each sheet both sides of the liquid crystal cell. Further, the optical compensatory sheet is preferably arranged such that its optic axis (direction of $n_y$) is almost parallel to the direction (aligned direction) of the major axis of the liquid crystalline molecule on the substrate.

In IPS mode shown in FIG. 2, switching of the direction of liquid crystal molecule within a plane parallel to the substrate is conducted. Therefore, variation of retardation depending upon viewing angle in the liquid crystal layer is greatly reduced, which results in enlarged viewing angle.

According to the study of the inventors, however, in the case that the LCD of FIG. 2 is not provided with the optical compensatory sheet, the LCD does not show an excellent viewing angle characteristics. In more detail, when the LCD is viewed in the specific oblique direction, reversion of gradation and coloration are produced not to enlarge viewing angle in the specific viewing direction. This is because there is the specific direction that retardation within the liquid crystal layer does not uniformly vary with variation of voltage.

In the IPS mode, birefringence mode is generally utilized. In the birefringence mode, coloration occurs in the display due to the above non-uniform variation of retardation in the specific viewing direction.

In the IPS mode, an optical rotatory mode can be also utilized. In this case, a pair of substrates of the liquid crystal cell are arranged such that the rubbing directions of the orientation layers of the substrates are crossed with reference to each other so as to vary the directions of the major axes of liquid crystal molecules with increase of the thickness of liquid crystal layer.

In the invention, the above problems (occurrence of reversion of gradation and coloration in the specific oblique direction) are resolved by using an optical compensatory sheet (22a, 22b) having the specific optical characteristics (i.e., optically negative uniaxial property and an optic axis parallel or almost parallel to the plane of the sheet).

The IPS mode usually employs nematic liquid crystal, whose molecule has an optically positive uniaxial property. In FIG. 2 (a) and (b), the liquid crystal molecules are aligned parallel to the substrates (homogeneous alignment). Mechanism for compensating the retardation produced by a liquid crystal cell using nematic liquid crystal (IPS mode) is explained referring to FIG. 3. The main refractive indices of the nematic liquid crystal molecule and the main refractive indices of the optical compensatory sheet of the invention are shown in FIG. 3.

The optical compensatory sheet 31 is provided on the liquid crystal layer 32. The optical compensatory sheet 31 has an index ellipsoid 33 therein, and the liquid crystal layer 32 has an index ellipsoid 34 of liquid crystal molecule having an optically positive uniaxial property therein. The index ellipsoid 34 of liquid crystal molecule satisfies the condition of $n_x \approx n_z < n_y$ ($n_x$ and $n_y$ are main refractive indices within the substrate and $n_z$ is a main refractive index in the thickness direction of the layer). The index ellipsoid 33 of the optical compensatory sheet satisfies the condition of $n_x \approx n_z > n_y$ ($n_x$ and $n_y$ are main refractive indices within the sheet and $n_z$ is a main refractive index in the thickness direction of the sheet), i.e., the index ellipsoid 33 has optically negative uniaxial property and an optic axis parallel to the plane of the sheet (the plane of the substrate of the cell)).

Figure 3:
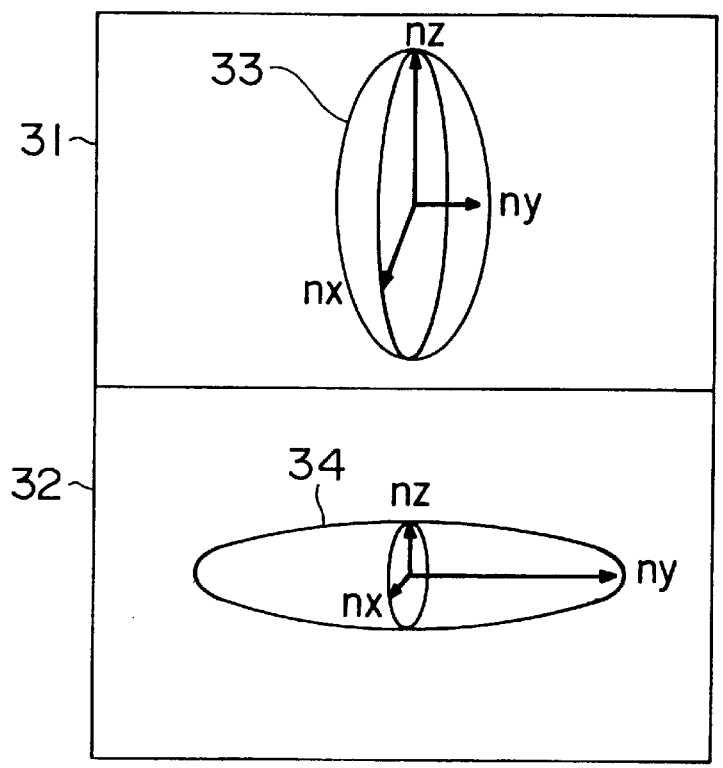
FIG. 3 is a view schematically showing mechanism for compensating the retardation produced by a liquid crystal cell utilizing IPS mode.

FIG. 3 indicates that the light in various directions passed through the liquid crystal layer 32 is compensated by the optical compensatory sheet 31. Therefore, the light entered from the above-mentioned specific direction showing non-uniform variation of retardation is also compensated by the optical compensatory sheet 31. Thus, the use of the optical compensatory sheet of the invention gives the liquid crystal display having an enlarged viewing angle equal to that of CRT, in which leak of light does not occur when black display is viewed from various directions.

The liquid crystal molecules are aligned parallel to the substrates (homogeneous alignment) as shown in FIG. 2 (a) and (b). However, the directions of the major axes of liquid crystal molecules may vary with increase of the thickness of liquid crystal layer to twist the directions of the major axes along the thickness direction, as mentioned above. In this case, the operation mode of the display does not follow a birefringence mode but an optical rotatory mode. To optically compensate the liquid crystal layer, it is preferred to use an optical compensatory sheet whose optic axis is twisted in the direction reverse to the twisted direction of the major axes of liquid crystal molecules. Such an optical compensatory sheet can be, for example, prepared by superposing optical compensatory sheets having a different direction of optic axis one another.

The optical compensatory sheet employed in the invention has an optically negative uniaxial property and an optic axis parallel to the plain of the sheet. However, the optic axis of the sheet may not be perfectly parallel to the sheet, and in this case the optic axis can be inclined at an angle of not more than 20 degrees from the sheet, so as to obtain the compensatory effect according to the invention.

The above-mentioned explanation is performed as for normally black mode. However, the liquid crystal display can be driven in a normally white mode. These modes can be generally set by changing the combination of directions of the polarization axes. In any mode, it is preferred to dispose the optical compensatory sheet for compensation of black display.

The optical compensatory sheet employed in the invention has an optically negative uniaxial property and an optic axis parallel to the plane of the substrate. The optical compensatory sheet is widely employed for prevention of coloration in STN-LCD. The optical compensatory sheet of the invention defers from one for STN-LCD. In more detail, as the optical compensatory sheet for STN-LCD, a polycarbonate film having an optically positive uniaxial property and satisfying the condition of $n_x > n_z > n_y$ is usually employed.

The optical compensatory sheet employed in the invention generally satisfies the conditions of:

$$20 \leq (n_x - n_y) \times d \leq 1000 \tag{1}$$

$$0 \leq |(n_x - n_z)| \times d \leq 200 \tag{2}$$

in which $n_x$ and $n_y$ are main refractive indices within the sheet, $n_z$ is a main refractive index in the thickness direction of the sheet, and d is the thickness in terms of nm of the sheet.

The condition (1) preferably is the condition (3), especially the condition (4):

$$50 \leq (n_x - n_y) \times d \leq 800 \tag{3}$$

$$80 \leq (n_x - n_y) \times d \leq 500 \tag{4}$$

The condition (2) preferably is the condition (5), especially the condition (6):

$$0 \leq |(n_x - n_z) \times d| \leq 100 \tag{5}$$

$$0 \leq |(n_x - n_z) \times d| \leq 50 \tag{6}$$

As materials for preparing the optical compensatory sheet, various polymers and liquid crystalline compounds can be employed. The polymers or the liquid crystalline compounds may be employed singly or in combination of two or more kinds, and the polymers and the liquid crystalline compounds may be combined. Preferred are polymers having negative intrinsic birefringence and liquid crystalline discotic compounds having negative birefringence.

As the polymers having negative intrinsic birefringence, polystyrenes derived from styrene (including its derivative) or styrene and other monomer(s) polymerizable with styrene are preferably employed. The polystyrenes are roughly divided into a homopolymer of styrene or its derivative; a copolymer of styrene or its derivative and other monomer (s); a graft copolymer of styrene or its derivative and other monomer(s); and a mixture thereof.

Examples of the homopolymer include polystyrene, poly-α-methylstyrene, poly-o-methylstyrene, poly-p-methylstyrene, poly-p-chlorostyrene, poly-o-nitrostyrene, poly-p-aminostyrene, poly-p-carboxystyrene, poly-p-phenylstyrene and poly-2,5-dichlorostyrene.

Examples of the copolymer include styrene/acrylonitrile copolymer, styrene/methacrylonitrile copolymer, styrene/ methylmethacrylate copolymer, styrene/ethylmethacrylate copolymer, styrene/α-chloroacrylonitrile copolymer, styrene/methylacrylate copolymer, styrene/ethylacrylate copolymer, styrene/butylacrylate copolymer, styrene/acrylic acid copolymer, styrene/methacrylic acid copolymer, styrene/butadiene copolymer, styrene/isoprene copolymer, styrene/maleic anhydride copolymer, styrene/itaconic acid copolymer, styrene/vinylcarbazole copolymer, styrene/N-phenylacrylamide copolymer, styrene/vinylpyridine copolymer, styrene/vinylnaphthalene copolymer, α-methylstyrene/acrylonitrile copolymer, α-methylstyrene/methacrylonitrile copolymer, α-methylstyrene/vinyl acetate copolymer, styrene/α-methylstyrene/acrylonitrile copolymer, styrene/a-methylstyrene/methylmethacrylate copolymer, and styrene/styrene derivatives(s) copolymer.

Examples of the graft copolymer include the following polymers (p-1 to p-17); wherein (A1)–(A9) each are a trunk polymer portion, and (B1)–(B11) each are a branch portion (grafted portion). The following amount ratio means weight ratio.

(p-1): (A1)/(B1)=10/90
    (A1): styrene/butadiene copolymer (20/80)
    (B1): styrene/acrylonitrile/α-methylstyrene (60/20/20)
(p-2): (A1)/(B1)=5/95
(p-3): (A1)/(B2)=10/90
    (B2): styrene/acrylonitrile (80/20)
(p-4): (A1)/(B2)=7/93
(p-5): (A2)/(B3)=12.5/87.5
    (A2): styrene/butadiene copolymer (50/50)
    (B3): styrene/acrylonitrile (75/25)
(p-6): (A2)/(B4)=15/85
    (B4): styrene/acrylonitrile/α-methylstyrene (60/30/10)
(p-7): (A2)/(B4)=10/90
(p-8): (A2)/(B3)=10/90
(p-9): (A3)/(B5)=5/95
    (A3): polybutadiene
    (B5): styrene/acrylonitrile (70/30)
(p-10): (A3)/(B6)=10/90
    (B6): styrene/acrylonitrile/methacrylonitrile (75/15/10)
(p-11): (A2)/(B7)=12/88
    (B7): styrene
(p-12): (A4)/(B8)=10/90
    (A4): styrene/butadiene copolymer (23/77)
    (B8): styrene/methylmethacrylate/acrylonitrile (70/10/20)
(p-13) : (A5)/(B9)=10/90
    (A5): polyisoprene
    (B9): styrene/t-butylstyrene (70/30)
(p-14): (A6)/(B2)=10/90
    (A6): acrylonitrile/butadiene copolymer (50/50)
(p-15): (A7)/(B1)=12/88
    (A7): acrylonitrile/butadiene copolymer (25/75)
(p-16): (A8)/(B10)=10/90
    (A8): ethylacrylate/butadiene copolymer (50/50)
    (B10): styrene/methylmethacrylate (80/20)
(p-7): (A9)/(B11)=15/85
    (A9): ethylacrylate/styrene/butadiene copolymer (40/30/30)
    (B11): styrene/methacrylonitrile (75/25)

As the polystyrenes, preferred are graft copolymers obtained by grafting to a styrene/butadiene copolymer at least one monomer selected from the group consisting of styrene, acrylonitrile and α-methylstyrene. The polystyrenes are described in Japanese Patent Provisional Publications No. 4(1992)-97322 and No. 6(1994)-67169.

The optical compensatory sheet having an optically negative uniaxial property and an optic axis parallel to the plane of the substrate is, for example, prepared by stretching uniaxially one of the polystyrene polymers.

The optical compensatory sheet employed in the invention can be also prepared using the liquid crystalline discotic compound. In more detail, the sheet can be obtained by the steps of: forming an orientation layer for homeotropic alignment on the transparent support (e.g., triacetyl cellulose film), coating a solution containing the liquid crystalline discotic compound on the orientation layer, drying the coated layer to form a discotic compound layer, and heating the discotic compound layer to a liquid crystalline phase (e.g., discotic nematic phase). The liquid crystalline discotic compound has its optic axis in a direction perpendicular to the discotic plane, and therefore the discotic plane is shifted to the direction perpendicular to the support by forming the discotic compound layer on the orientation layer, whereby the optic axis of the discotic compound layer is in the plane of the discotic compound layer. However, it is usually difficult that the discotic plane is shifted to the direction perpendicular to the support (90 degrees) by using only one orientation layer. Therefore, the sheet is preferably prepared by superposing another transparent support having an orientation layer separately prepared on the discotic compound layer before heating such that the orientation layer is in contact with the discotic compound layer,. and heating the obtained composite, whereby the discotic plane can be easily shifted in the direction almost perpendicular to the support.

The discotic compound may have a polymerizable functional group. In this case, the discotic compound layer can formed by coating a solution containing a discotic compound having the functional group on the orientation layer provided on the support, drying the coated layer, and curing the dried layer (e.g., by radiation of UV light). The cured discotic compound layer does not usually show a liquid crystalline property.

Further, the optical compensatory sheet is also prepared using a liquid crystalline polymer.

In the liquid crystal display utilizing IPS mode which is shown in FIG. 2, it is required to apply a voltage in the direction parallel or almost parallel to the substrate to the liquid crystal molecules in the cell. Such a parallel application of voltage is generally conducted using a substrate having electrodes in the form of the teeth of a comb (i.e., comb teeth-shaped electrode). The substrate having the comb teeth-shaped electrode (interdigital electrode) is a structure that two linear electrodes are provided parallel each other on one substrate (see FIG. 4). The linear electrode may be provided on each of two substrates, such that the two electrodes is obliquely arranged each other. Further, TFT (thin-film-transistor) or diode element may be provided on the substrate.

Figure 4:
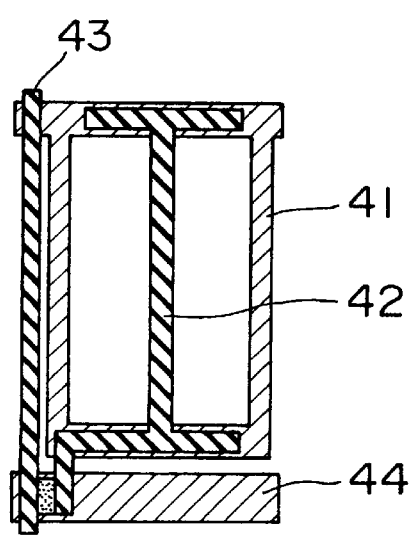
FIG. 4 is a view schematically showing an example of the electrode of the liquid crystal display utilizing IPS mode according to the invention.

An example of a structure of the comb teeth-shaped electrode having TFT, which is preferably employable in the invention, is shown in FIG. 4. The comb teeth-shaped electrode is composed of a common electrode 41 and a pixel electrode 42, and a signal electrode 43 and a scanning electrode 44 constituting TFT. An area surrounded by the electrode forms a pixel. In IPS mode, these electrodes are arranged around the pixel, and therefore the electrodes may be not transparent.

In a liquid crystal cell having a pair of substrates each of which has an electrode (i.e., which does not utilize IPS mode), the liquid crystal layer is insulated, and therefore the liquid crystal cell is scarcely influenced by outside electric field. However, since the liquid crystal cell of IPS mode is provided with the electrodes parallel to the substrate, the liquid crystal layer is not insulated. In the liquid crystal cell of IPS mode, therefore, the liquid crystal layer is influenced by outside electric field to bring about variation of alignment of liquid crystal (i.e., variation of transmittance). Thus, a protective insulation layer (an insulation layer for the protection of the electrode) is preferably provided on the electrode and substrate in order to insulate the liquid crystal layer from outside electric field.

As liquid crystal materials employable for the liquid crystal cell utilizing IPS mode, any materials can be employed so long as they are aligned parallel or almost parallel to the substrate. Nematic liquid crystal is generally employed. The anisotropy of dielectric constant ($\Delta\epsilon$) of the liquid crystal may be positive or negative.

In the invention, liquid crystal molecules preferably form a homogeneous alignment in the liquid crystal cell, and however may form a twist alignment in the thickness direction as mentioned above. These alignments can be, for example, controlled by varying combination of rubbing directions of the substrates.

In the liquid crystal cell utilizing IPS mode, the gap (dc) and anisotropy of refractive index ($\Delta n_c$) are determined so as to satisfy the following ranges in order to maximize the transmittance in colorless display. $d_c \cdot \Delta n_c$ is preferably in the range of 0.1 to 1.0 $\mu$m, more preferably 0.2 to 0.5 $\mu$m and especially 0.2 to 0.4 $\mu$m, In the liquid crystal display of the invention, not only IPS mode, but also a usual mode applying voltage in the direction perpendicular to the substrates can be utilized. However, it is required to use a liquid crystal having properties that aligns parallel to a plane of the substrate and varies its direction of molecular major axis within a plane parallel to the plane of the substrate under variation of voltage applied to the liquid crystal cell. Examples of liquid crystals employable in a usual mode applying voltage in the direction perpendicular to the substrates, include ferroelectric liquid crystals or anti-ferroelectric liquid crystals.

The liquid crystal display of the invention can be employed for a directly viewing type or a projection type, and can be also employed for a light modulation element.

Examples of the present invention and comparison examples are given below, but these examples by no means restrict the invention.

EXAMPLE (1-1) Preparation of IPS mode liquid crystal cell 1

A comb teeth-shaped electrode shown in FIG. 4 was formed on a glass plate such that a distance between the adjoining electrodes was 20 $\mu$m, and a polyimide layer was formed on the glass plate, and then the layer was subjected to a rubbing treatment to form an orientation layer.

Figure 5:
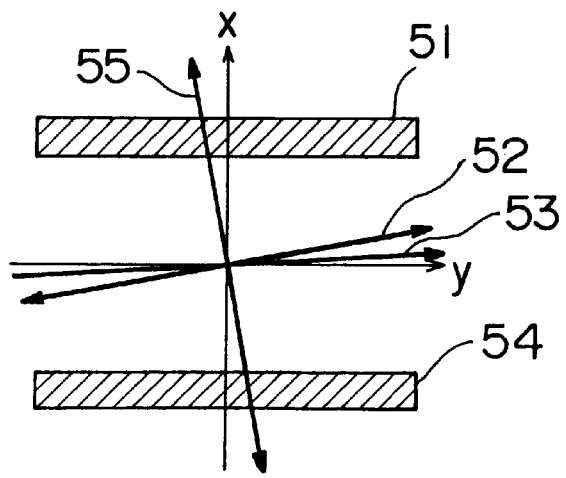
FIG. 5 is a view showing an example of the relationship of the polarization axis, the axis of optic optical compensatory sheet and the rubbing direction of orientation layer of the cell which constitute the liquid crystal display utilizing IPS mode according to the invention

The rubbing treatment was explained referring to FIG. 5. The rubbing treatment was conducted such that the rubbing direction 53 intersected the x-axis at an angle of 88 degrees when the linear electrodes 51, 54 (constituting the comb teeth-shaped electrode) were arranged to be perpendicular to the x-axis. The reference number 52 indicates a transparent axis (polarization axis) or an axis of an optical compensatory sheet, and the reference number 55 indicates a transparent axis (polarization axis).

On one side of a glass plate prepared separately, polyimide layer was formed, and the layer was subjected to a rubbing treatment to form an orientation layer.

The obtained two glass plates were superposed each other such that the orientation layers were faced to each other and such that the distance therebetween (gap: $d_c$) was 3.9 $\mu$m and these rubbing directions were parallel to each other, and were bonded together. A nematic crystal liquid composition having an anisotropy of refractive index ($\Delta n_c$) of 0.072 and an anisotropy of dielectric index ($\Delta\epsilon$) of 4.5 (positive) was sealed into the gap of the glass plates.

A value of $d_c \cdot \Delta n_c$ was 281 nm.

(1-2) Preparation of IPS mode liquid crystal cell 2

A comb teeth-shaped electrode shown in FIG. 4 was formed on a glass plate such that a distance between the adjoining electrodes was 20 $\mu$m, and a polyimide layer was formed on the glass plate, and then the layer was subjected to a rubbing treatment to form an orientation layer.

Figure 6:
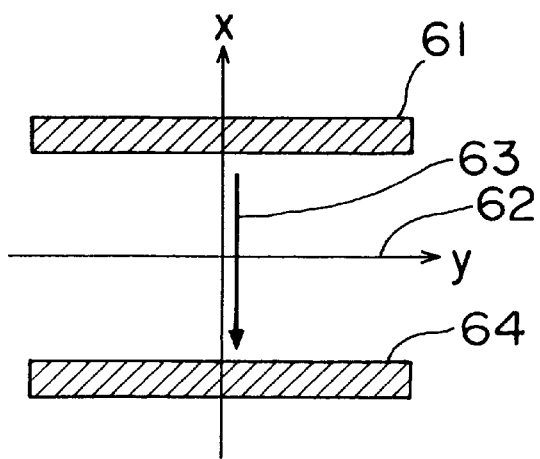
FIG. 6 is a view showing an example of the relationship of the polarization axis and the optic axis of optical compensatory sheet which constitute the liquid crystal display utilizing IPS mode according to the invention

The rubbing treatment was explained referring to FIG. 6. The rubbing treatment was conducted such that the rubbing direction 62 intersected the x-axis at an right angles when the electrodes 61, 64 constituting the comb teeth-shaped electrode was arranged to be perpendicular to the x-axis. The reference number 63 indicates a transparent axis (polarization axis) or an axis of an optical compensatory sheet.

On one side of a glass sheet prepared separately, polyimide layer was formed, and the layer was subjected to a rubbing treatment (rubbing direction 63) to form an orientation layer.

The obtained two glass plates were superposed each other such that the orientation layers were faced to each other and such that the distance therebetween (gap: $d_c$) was 6.5 $\mu$m and the two rubbing directions were perpendicular to each other whereby the nematic liquid crystal is enabled to form high twisted condition, and were bonded together. A nematic crystal liquid composition having an anisotropy of refractive index ($\Delta n_c$) of 0.072 and an anisotropy of di-electric index ($\Delta\epsilon$) of 4.5 (positive) was sealed into the gap of the glass plates.

A value of $d_c \cdot \Delta n_c$ was 468 nm.

(1-3) Preparation of IPS mode liquid crystal cell 3

A comb teeth-shaped electrode shown in FIG. 4 was formed on a glass plate such that a distance between the adjoining electrodes was 20 $\mu$m, and a polyimide layer was formed on the glass plate, and then the layer was subjected to a rubbing treatment to form an orientation layer.

The rubbing treatment was conducted such that the rubbing direction intersected the x-axis at an angle of 15 degrees when the electrodes constituting the comb teeth-shaped electrode were arranged to be perpendicular to the x-axis.

On one side of a glass sheet prepared separately, polyimide layer was formed, and the layer was subjected to a rubbing treatment to form an orientation layer.

The obtained two glass plates were superposed each other such that the orientation layers were faced to each other and such that the distance therebetween (gap: $d_c$) was 6.3 $\mu$m and these rubbing directions were parallel to each other, and were bonded together. A nematic crystal liquid composition (trade name: ZLI-2806; available from Merck & Co., Inc.) having an anisotropy of refractive index ($\Delta n_c$) of 0.0437 and an anisotropy of dielectric index ($\Delta\epsilon$) of −4.8 (negative) was sealed into the gap of the glass plates.

A value of $d_c \cdot \Delta n_c$ was 274 nm.

(2-1) Preparation of optical compensatory sheet 1

A graft copolymer obtained by grafting 90 weight parts of the following monomer mixture (B) to 10 weight parts of the following copolymer (A):

(A) styrene/butadiene copolymer (weight ratio: 20/80)
(B) styrene/acrylonitrile/a-methylstyrene (weight ratio: 60/20/20) was prepared.

170 g of the above graft copolymer was dissolved in 830 g of dichloromethane to prepare a coating liquid. The coating liquid was casted on a glass plate, allowed to stand in an atmosphere of room temperature for 5 minutes, and further dried with a warm air (45° C.) to form a copolymer film of a thickness of 70 μm. The film was peeled from the glass plate. The peeled film was fixed in a rectangular frame, dried at a temperature of 70° C. for 1 hour, and further dried at a temperature of 110° C. for 15 hours. The obtained film was uniaxially stretched 1.9 times at a temperature of 115° C. using a tensile tester (Strograph R2, available from Toyo Seiki Co., Ltd.).

As for the obtained uniaxially stretched film (optical compensatory sheet), Re (retardation) values in various directions were measured by an ellipsometer (AEP-100, available from Shimadzu Seisakusho, Ltd.) to determine the refractive indices. The results were as follows:

A value of $(n_x-n_y) \times d$ of the above mentioned condition (1) was 122 nm, and a value of $(n_x-n_z) \times d$ of the above mentioned condition (2) was 0 nm. The sheet had an optic axis parallel to the plane of the sheet.

(2-2) Preparation of optical compensatory sheet 2

On a gelatin layer of a triacetyl cellulose film having a thickness of 100 μm (available from Fuji Photo Film Co., Ltd.) having the gelatin layer (thickness: 0.1 μm) thereon, SiO was obliquely deposited to form an orientation layer of SiO.

On the orientation layer, a coating solution (10 weight % solution) obtained by dissolving a discotic liquid crystalline compound (1) indicated below in methyl ethyl ketone was coated using a spin coater at a revolution of 2,000 rpm, and dried to form a discotic liquid crystal layer of a thickness of 1.5 μm.

compound (1):

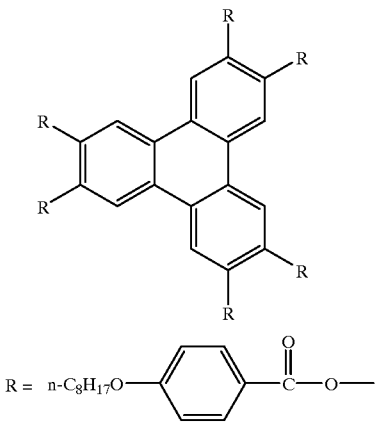

Separately, on a gelatin layer of a triacetyl cellulose film having a thickness of 100 μm (available from Fuji Photo Film Co., Ltd.) having the gelatin layer (thickness: 0.1 μm) thereon, SiO was obliquely deposited to form an orientation layer of SiO in the same manner as above, to prepare a film provided with the orientation layer (having no discotic liquid crystal layer).

The latter film provided with the orientation layer was superposed on the former film having the orientation layer and discotic liquid crystal layer such that the orientation layer of the latter film was in contact with the discotic liquid crystal layer of the former film. The resultant composite was heated at a temperature of 180° C., and cooled to a room temperature. Subsequently, the latter film was peeled from the composite to prepare a triacetyl cellulose film having an oriented discotic liquid crystal layer (optical compensatory sheet 2).

As for the obtained optical compensatory sheet 2, Re (retardation) values in various directions were measured by an ellipsometer (AEP-100, available from Shimadzu Seisakusho, Ltd.) to determine the refractive indices. The results were as follows:

A value of $(n_x-n_y) \times d$ of the above mentioned condition (1) was 80 nm, and a value of $(n_x-n_z) \times d$ of the above mentioned condition (2) was 7 nm. The sheet had an optic axis parallel to the plane of the sheet.

(2-3) Preparation of optical compensatory sheet 3

On a gelatin layer of a triacetyl cellulose film having a thickness of 100 μm (available from Fuji Photo Film Co., Ltd.) having the gelatin layer (thickness: 0.1 μm) thereon, SiO was obliquely deposited to form an orientation layer of SiO.

On the orientation layer, a coating solution obtained by dissolving a mixture of 1.8 g of the following discotic liquid crystalline compound (2) and 0.06 g of photopolymerization initiator (Irgacure-907, available from Ciba-Geigy) in 13.2 g of methyl ethyl ketone was coated using a spin coater at a revolution of 2,000 rpm, and dried to form a discotic liquid crystal layer. Subsequently, the discotic liquid crystal layer was heated to at a temperature of 180° C., UV light was irradiated on the discotic liquid crystal layer with keeping the layer at the temperature using a high-pressure mercury lamp (120W/cm) for one minute and cooled to room temperature to form a cured discotic liquid crystal layer 1 of a thickness of 1.7 μm.

compound (2):

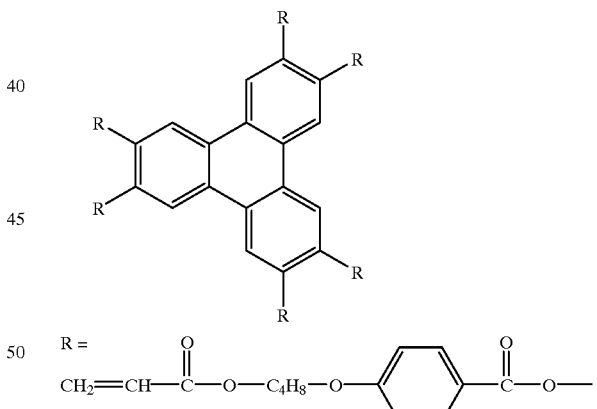

The surface of the cured discotic liquid crystal layer 1 was rubbed in the direction at 22.5 degrees to the deposited direction of SiO to be subjected to a rubbing treatment, and on the rubbed surface, a cured discotic liquid crystal layer 2 was formed in the same manner as in formation of the cured discotic liquid crystal layer 1.

The surface of the cured discotic liquid crystal layer 2 was rubbed in the direction at 22.5 degrees to the rubbing direction of the cured discotic liquid crystal layer 1 to be subjected to a rubbing treatment, and on the rubbed surface, a cured discotic liquid crystal layer 3 was formed in the same manner as in formation of the cured discotic liquid crystal layer 1. Cured discotic liquid crystal layers 4 and 5 were formed in the same manner as in formation of the cured discotic liquid crystal layer 3, to form the five cured discotic liquid crystal layers on the orientation layer.

The triacetyl cellulose film was peeled from the resultant composite to prepare an optical compensatory sheet 3 comprising five cured discotic liquid crystal layers.

All the cured discotic liquid crystal layers had the optic axis within the plane of the layer, and the optic axes of the adjoining layers were intersected at an angle of 22.5 degrees. Further, the optic axes of the five layers formed counterclockwise line in the direction of the thickness.

As for the optical compensatory sheet 3, Re (retardation) values in various directions were measured by an ellipsometer (AEP-100, available from Shimadzu Seisakusho, Ltd.) to determine the refractive indices. The results were as follows:

A value of $(n_x-n_y) \times d$ of the above mentioned condition (1) of each layer of the sheet 3 was 94 nm and the value of the sheet was 470 nm, and a value of $(n_x-n_z) \times d$ of the above mentioned condition (2) of the sheet 3 were 5 nm. The sheet had an optic axis parallel to the plane of the sheet.

EXAMPLE 1

Preparation of IPS mode liquid crystal display

The optical compensatory sheet 1 (prepared previously) was bonded onto the one side of the IPS mode liquid crystal cell 1 (prepared previously), and a pair of polarizing sheets each were bonded onto the optical compensatory sheet 1 and onto the other side of the IPS mode liquid crystal cell 1 so as to form crossed nicols, whereby a liquid crystal display (LCD) was prepared.

In the LCD, one of the polarizing sheets was arranged such that its polarization axis and x-axis (shown in FIG. 5) intersected at an angle of 80 degrees, and the other of the polarizing sheets was arranged such that its polarization axis and x-axis intersected at an angle of −10 degrees. The optical compensatory sheet was arranged between the liquid crystal cell and the polarizing sheet whose polarization axis and x-axis intersected at an angle of 80 degrees, such that its optic axis and x-axis intersected at an angle of 80 degrees.

[Evaluation of liquid crystal display]

Voltage of a rectangular wave of 55 Hz (on-voltage and off-voltage) was applied to the LCD. The on-voltage was set to show the maximum transmittance, and the off-voltage was set to show the minimum transmittance.

The transmittance of each of eight gradations in the direction that shows the maximum viewing angle dependence (the direction formed by the direction at an angle of −45 degrees to x-axis (FIG. 5) and that of an angle of 135 degrees to x-axis) was measured by varying the viewing angle using a spectrophotometer (LCD-5000, available from Otsuka Electronics Co., Ltd.). The eight gradations were represented by eight line graphs in FIG. 7.

Figure 7:
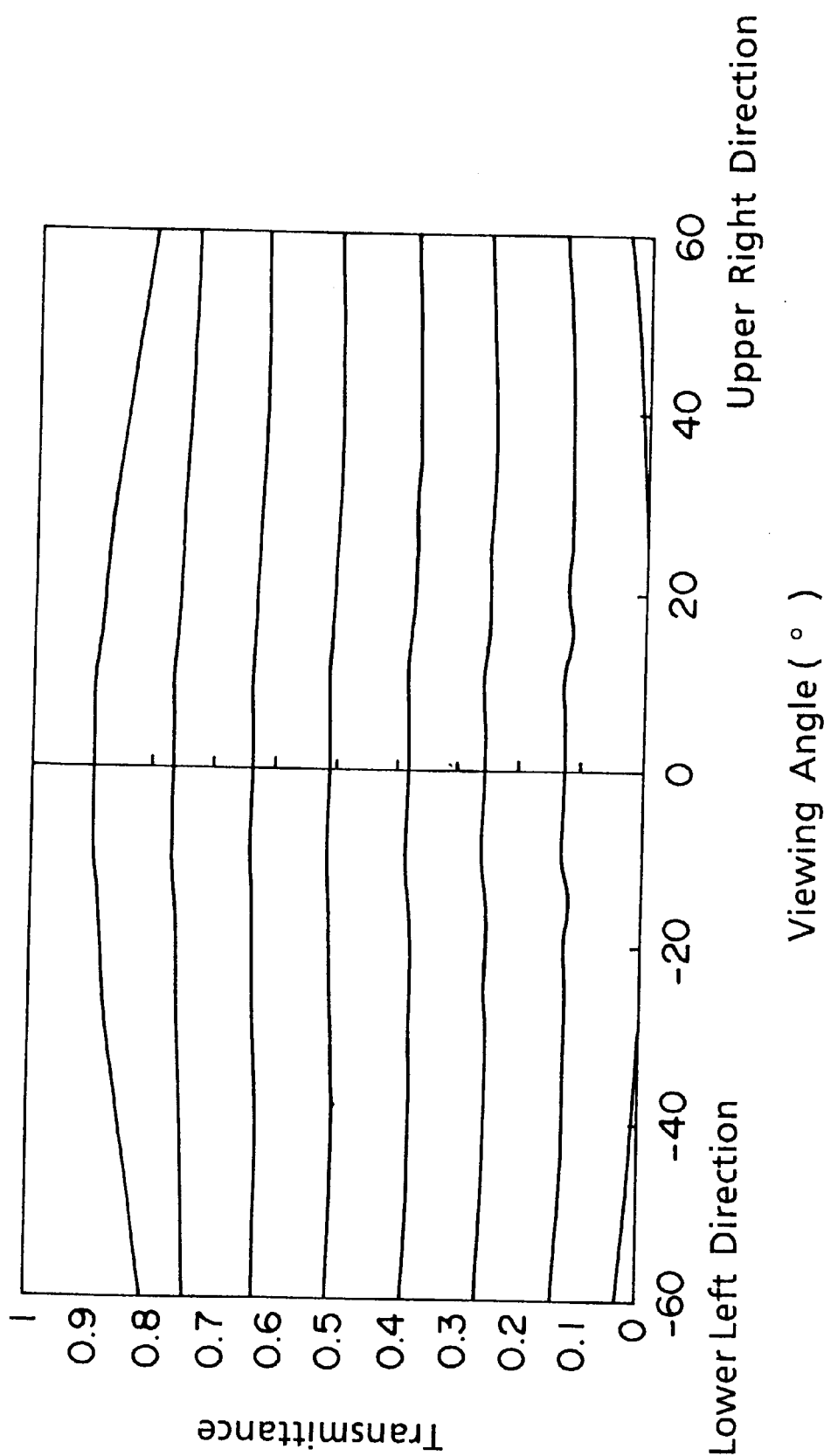
FIG. 7 is a graph showing the gradation characteristics of the liquid crystal display obtained in Example 1.

The obtained result is shown in FIG. 7.

EXAMPLE 2

Preparation of IPS mode liquid crystal display

The optical compensatory sheet 2 (prepared previously) was bonded onto both sides of the IPS mode liquid crystal cell 1 (prepared previously), and a pair of polarizing sheets each were bonded onto the optical compensatory sheets 2 provided on both sides of the IPS mode liquid crystal cell 1 so as to form crossed nicols, whereby a liquid crystal display (LCD) was prepared.

In the LCD, one of the polarizing sheets was arranged such that its polarization axis and x-axis (shown in FIG. 5) intersected at an angle of 80 degrees, and the other of the polarizing sheets was arranged such that its polarization axis and x-axis intersected at an angle of −10 degrees. Both optical compensatory sheets were arranged such that both optic axes and x-axis intersected at an angle of 80 degrees.

[Evaluation of liquid crystal display]

Voltage of a rectangular wave of 55 Hz (on-voltage and off-voltage) was applied to the LCD in the same manner as in Example 1.

In more detail, the transmittance of each of eight gradations in the direction that shows the maximum viewing angle dependence was measured by varying the viewing angle using a spectrophotometer (LCD-5000, available from Otsuka Electronics Co., Ltd.). The eight gradations were represented by eight line graphs in FIG. 8.

Figure 8:
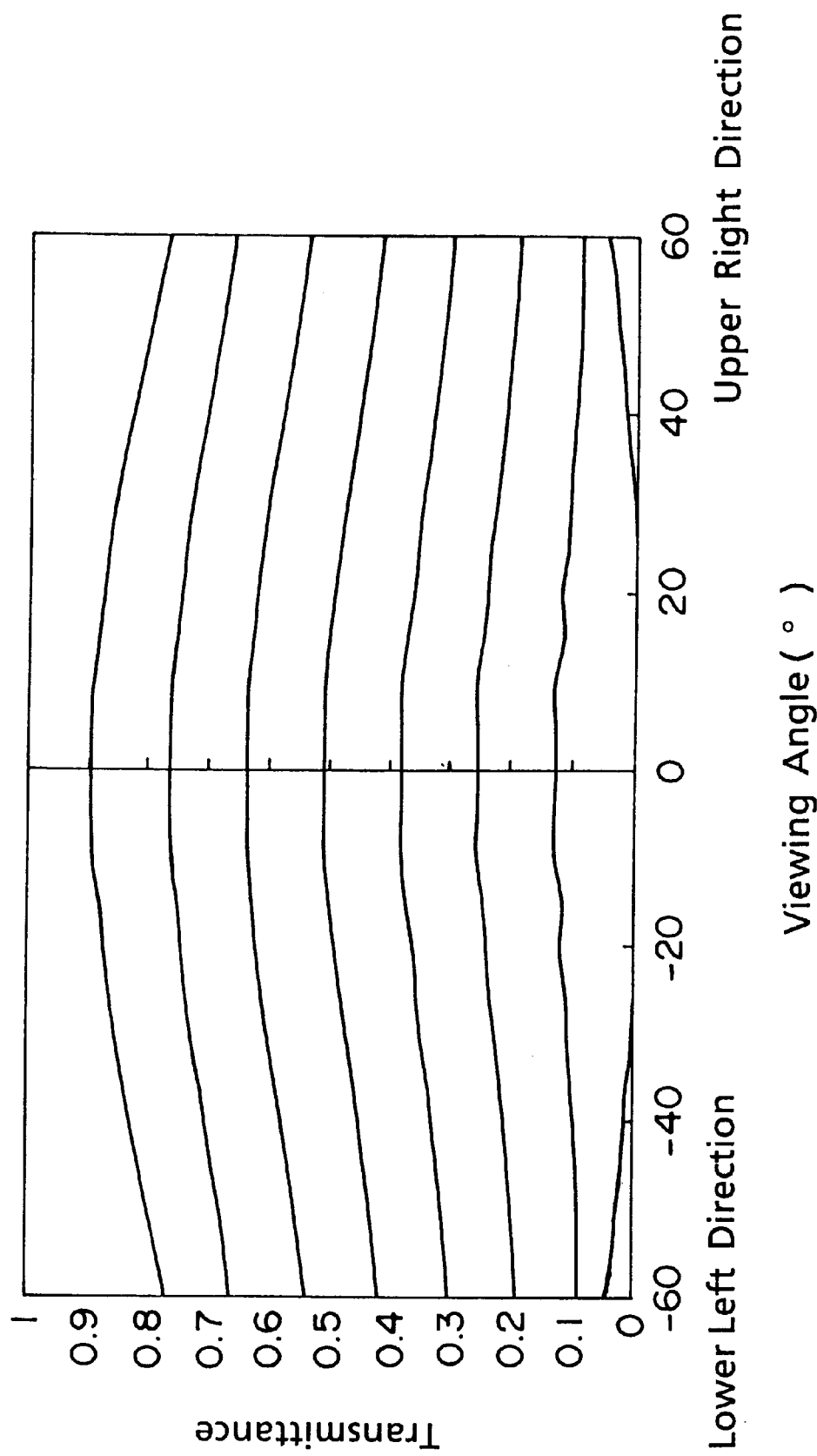
FIG. 8 is a graph showing the gradation characteristics of the liquid crystal display obtained in Example 2.

The obtained result is shown in FIG. 8.

COMPARISON EXAMPLE 1

Preparation of IPS mode liquid crystal display

A pair of polarizing sheets each were bonded onto both sides of the IPS mode liquid crystal cell 1 so as to form crossed nicols, whereby a liquid crystal display (LCD) was prepared.

In the LCD, one of the polarizing sheets was arranged such that its polarization axis and x-axis (shown in FIG. 5) intersected at an angle of 80 degrees, and the other of the polarizing sheets was arranged such that its polarization axis and x-axis intersected at an angle of −10 degrees.

[Evaluation of liquid crystal display]

Voltage of a rectangular wave of 55 Hz (on-voltage and off-voltage) was applied to the LCD in the same manner as in Example 1.

In more detail, the transmittance of each of eight gradations in the direction that shows the maximum viewing angle dependence was measured by varying the viewing angle using a spectrophotometer (LCD-5000, available from Otsuka Electronics Co., Ltd.). The eight gradations were represented by eight line graphs in FIG. 9.

Figure 9:
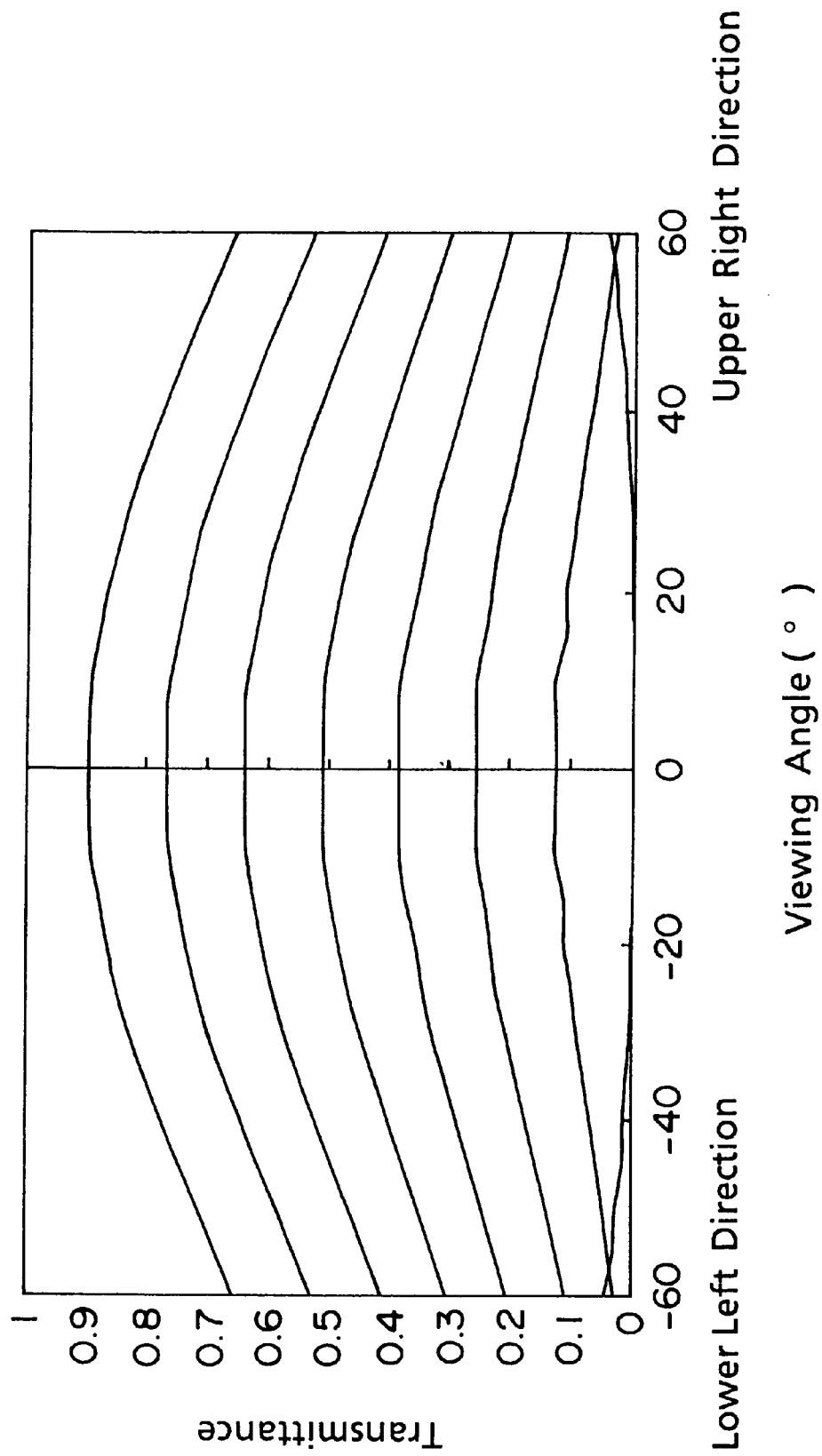
FIG. 9 is a graph showing the gradation characteristics of the liquid crystal display obtained in Comparison Example 1.

The obtained result is shown in FIG. 9.

EXAMPLE 3

Preparation of IPS mode liquid crystal display

The optical compensatory sheet 3 (prepared previously) was bonded onto one side of the IPS mode liquid crystal cell 2 (prepared previously), and a pair of polarizing sheets each were bonded onto the optical compensatory sheet 3 and onto the other side of the IPS mode liquid crystal cell 2 so as to form crossed nicols, whereby a liquid crystal display (LCD) was prepared.

In the LCD, one of the polarizing sheets was arranged such that its polarization axis and x-axis (shown in FIG. 6) intersected at an angle of 0 degree, and the other of the polarizing sheets was arranged such that its polarization axis and x-axis intersected at an angle of 90 degrees. The optical compensatory sheet 3 was arranged such that the optic axis of the discotic layer on the liquid crystal cell side of the five discotic layers was parallel to the rubbing direction of the glass plate (of the liquid crystal cell) faced to the discotic layer.

[Evaluation of liquid crystal display]

Voltage of a rectangular wave of 55 Hz (on-voltage and off-voltage) was applied to the LCD in the same manner as in Example 1.

In more detail, the transmittance of each of eight gradations in the direction that shows the maximum viewing angle dependence was measured by varying the viewing angle using a spectrophotometer (LCD-5000, available from Otsuka Electronics Co., Ltd.). The eight gradations were represented by eight line graphs in FIG. 10.

Figure 10:
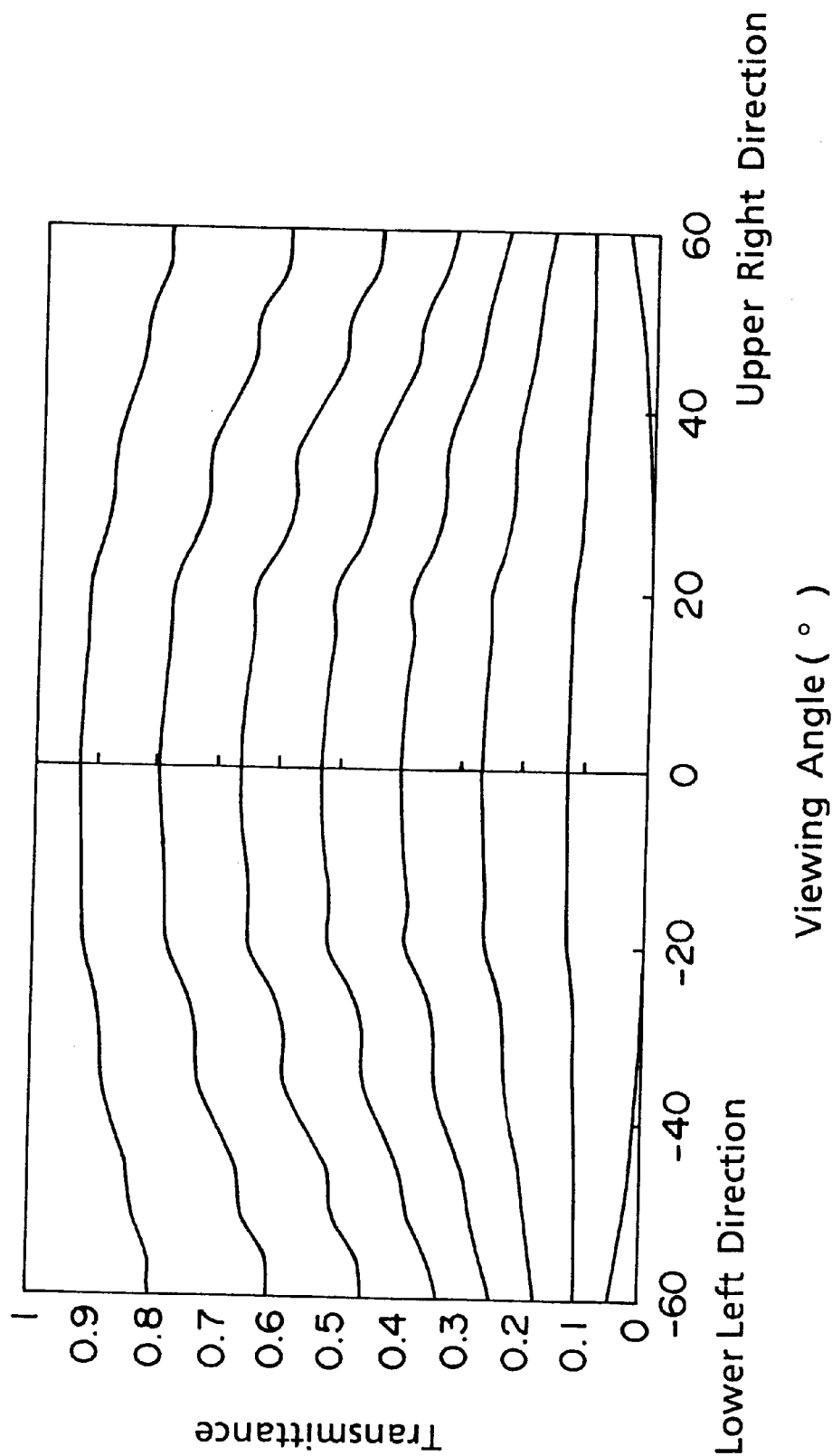
FIG. 10 is a graph showing the gradation characteristics of the liquid crystal display obtained in Example 3.

The obtained result is shown in FIG. 10.

COMPARISON EXAMPLE 2

Preparation of IPS mode liquid crystal display

A pair of polarizing sheets each were bonded onto both sides of the IPS mode liquid crystal cell 2 so as to be parallel to each other, whereby a liquid crystal display (LCD) was prepared.

In the LCD, the polarizing sheets were arranged such that its polarization axis and x-axis (shown in FIG. 6) intersected at an angle of 0 degree.

[Evaluation of liquid crystal display]

Voltage of a rectangular wave of 55 Hz (on-voltage and off-voltage) was applied to the LCD in the same manner as in Example 1.

In more detail, the transmittance of each of eight gradations in the direction that shows the maximum viewing angle dependence was measured by varying the viewing angle using a spectrophotometer (LCD-5000, available from Otsuka Electronics Co., Ltd.). The eight gradations were represented by eight line graphs in FIG. 11.

Figure 11:
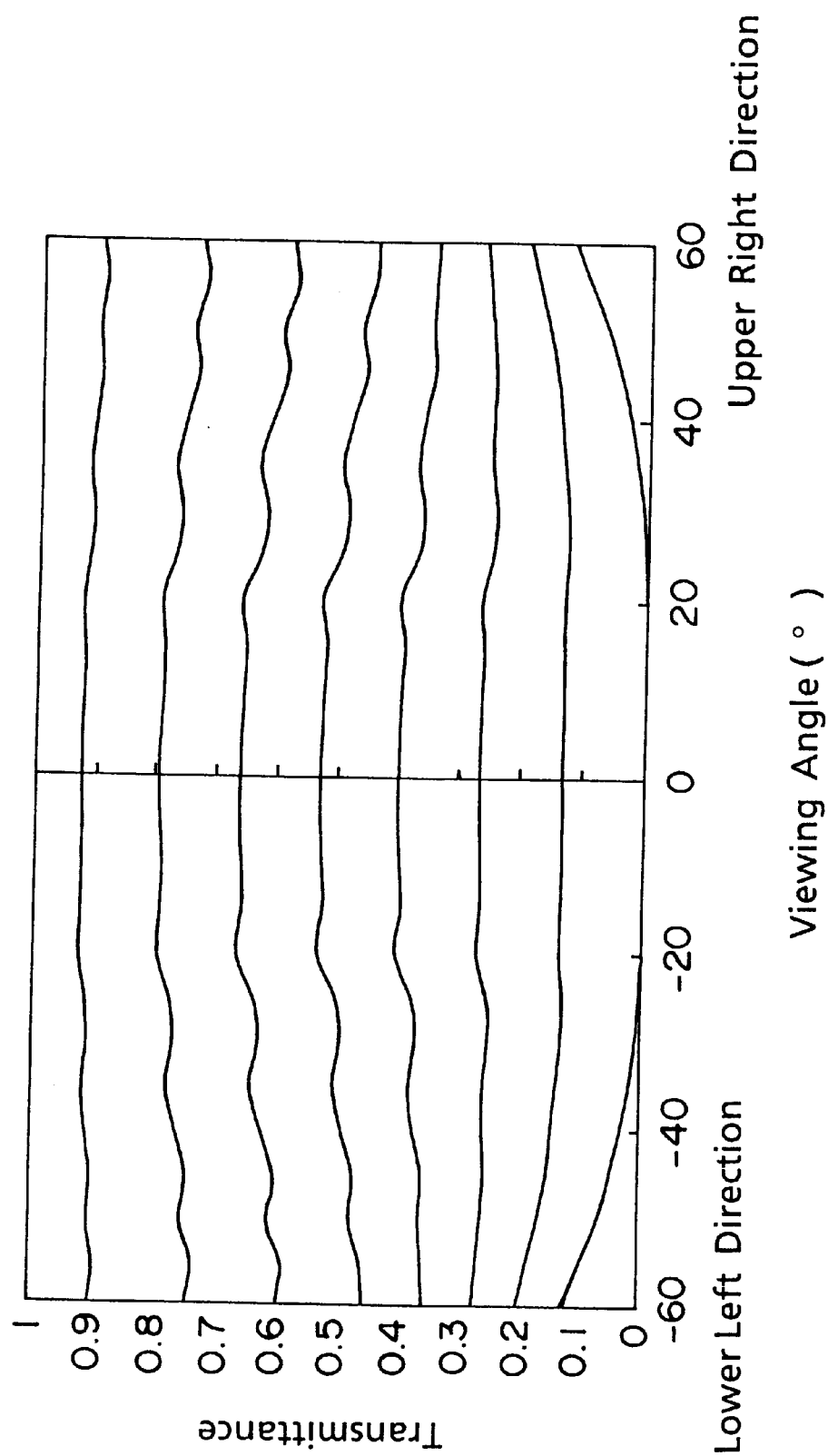
FIG. 11 is a graph showing the gradation characteristics of the liquid crystal display obtained in Comparison Example 2.

The obtained result is shown in FIG. 11.

EXAMPLE 4

Preparation of IPS mode liquid crystal display

The optical compensatory sheet 3 (prepared previously) was bonded onto one side of the IPS mode liquid crystal cell 1 (prepared previously), and a pair of polarizing sheets each were bonded onto the optical compensatory sheet 3 and onto the other side of the IPS mode liquid crystal cell 1 so as to form crossed nicols, whereby a liquid crystal display (LCD) was prepared.

In the LCD, one of the polarizing sheets was arranged such that its polarization axis and x-axis (shown in FIG. 5) intersected at an angle of 20 degrees, and the other of the polarizing sheets was arranged such that its polarization axis and x-axis intersected at an angle of 70 degrees. The optical compensatory sheet 3 was arranged between the liquid crystal cell and the polarizing sheet whose polarization axis and x-axis intersected at an angle of 20 degrees, such that its optic axis and x-axis intersected at an angle of 20 degrees.

[Evaluation of liquid crystal display]

Voltage of a rectangular wave of 55 Hz (on-voltage and off-voltage) was applied to the LCD in the same manner as in Example 1.

In more detail, the transmittance of each of eight gradations in the direction that shows the maximum viewing angle dependence was measured by varying the viewing angle using a spectrophotometer (LCD-5000, available from Otsuka Electronics Co., Ltd.). The eight gradations were represented by eight line graphs in FIG. 12.

Figure 12:
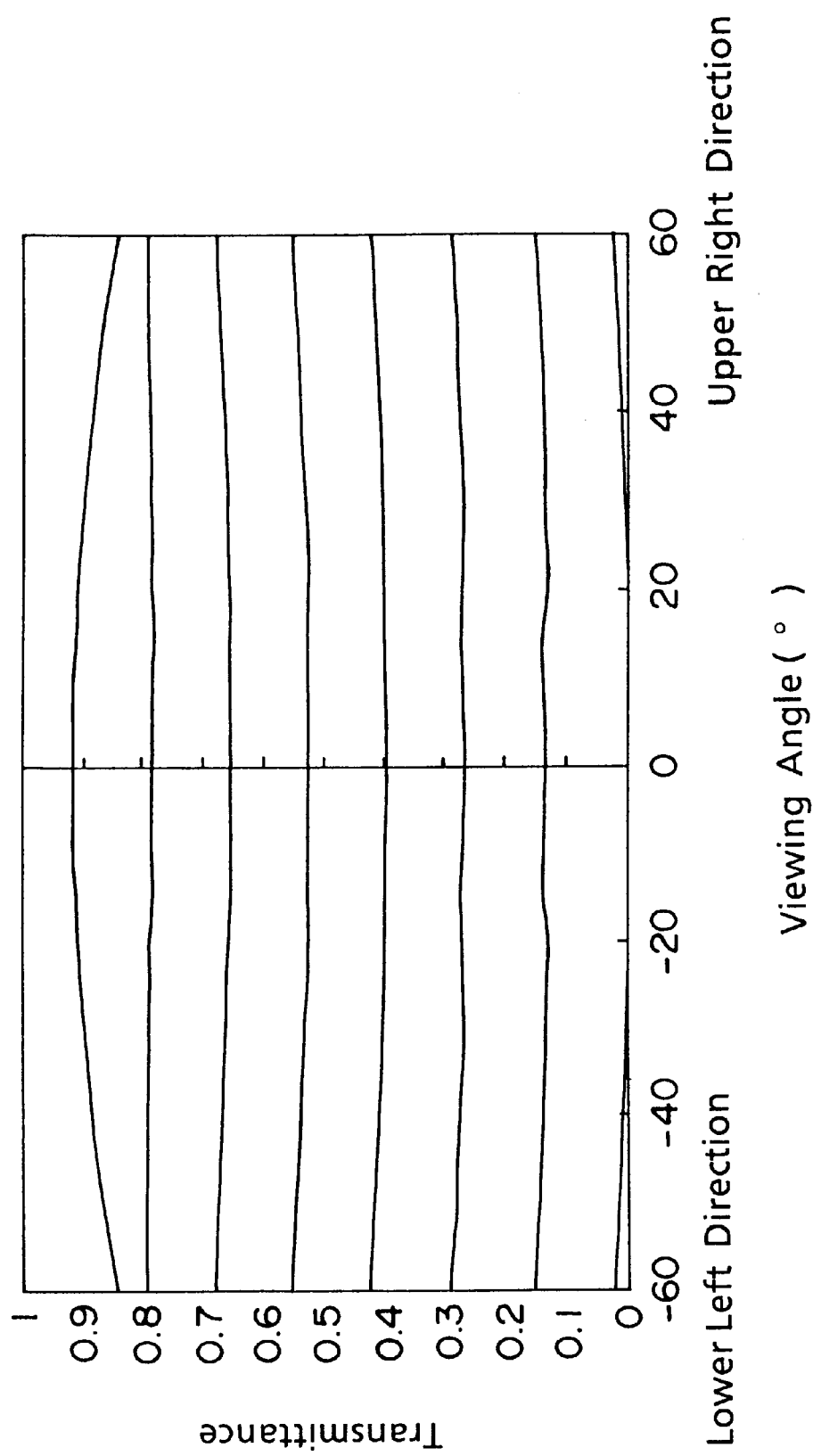
FIG. 12 is a graph showing the gradation characteristics of the liquid crystal display obtained in Example 4.

The obtained result is shown in FIG. 12.

As is apparent from results of FIGS. 7 to 12, the liquid crystal display obtained in Examples 1 to 4 showed greatly enlarged viewing angle, a high transmittance and good display in each of eight gradations as well as high contrast. The liquid crystal display obtained in Comparison Examples 1 showed a high transmittance and good display in each of eight gradations only in narrow viewing angle. Further, the liquid crystal display obtained in Comparison Examples 2 showed a good black display in only narrow viewing angle.

What is claimed is:

1. A liquid crystal display comprising a liquid crystal cell of an in-plane switching mode which comprises a pair of transparent substrates which are arranged parallel to each other and at least one of which is provided with an electrode thereon and liquid crystal sealed there between, a polarizing sheet arranged at least on one side of the cell, the liquid crystal aligning parallel to planes of the substrates and varying its direction of molecular major axis in a plane parallel to the planes of the substrates under variation of voltage applied to the liquid crystal cell;

wherein an optical compensatory sheet is provided between at least one side of the liquid crystal cell and the polarizing sheet, and the optical compensatory sheet having an optically negative uniaxial property and an optic axis parallel to a plane of the optical compensatory sheet, and wherein the optical compensatory sheet satisfies the conditions of:

$$20 \leq (n_x - n_y) \times d \leq 1000 \quad (1)$$

$$0 \leq |(n_x - n_z) \times d| \leq 200 \quad (2)$$

in which $n_x$ and $n_y$ are main refractive indices within the sheet, $n_z$ is a main refractive index in the thickness direction of the sheet, and d is the thickness in terms of nm of the sheet.

2. The liquid crystal display as defined in claim 1, wherein the optical compensatory sheet comprises a polymer having a negative intrinsic birefringence.

3. The liquid crystal display as defined in claim 1, wherein the optical compensatory sheet is a film comprising a copolymer which is derived from styrene and at least one of monomers polymerizable with styrene.

4. The liquid crystal display as defined in claim 1, wherein the liquid crystal cell is provided with a means of applying voltage in a direction parallel to the planes of the substrates.

5. The liquid crystal display as defined in claim 4, wherein at least one of the substrates of the liquid crystal cell has an insulation layer on the electrode of the substrate.

6. The liquid crystal display as defined in claim 4, wherein the liquid crystal is nematic liquid crystal.

* * * * *